(12) United States Patent
Achmad

(10) Patent No.: US 7,290,565 B2
(45) Date of Patent: Nov. 6, 2007

(54) METHODS AND APPARATUS FOR SPLITTING AND DIRECTING A PRESSURIZED FLUID JET WITHIN A SERVOVALVE

(75) Inventor: Muchlis Achmad, Santa Clarita, CA (US)

(73) Assignee: HR Textron, Inc., Santa Clarita, CA (US)

( * ) Notice: Subject to any disclaimer, the term of this patent is extended or adjusted under 35 U.S.C. 154(b) by 354 days.

(21) Appl. No.: 11/002,009

(22) Filed: Dec. 2, 2004

(65) Prior Publication Data

US 2006/0216167 A1   Sep. 28, 2006

(51) Int. Cl.
F15B 13/043   (2006.01)
(52) U.S. Cl. .............. 137/625.61; 137/625.63; 137/625.64
(58) Field of Classification Search ........... 137/625.61, 137/625.63, 625.64, 83; 91/3
See application file for complete search history.

(56) References Cited

U.S. PATENT DOCUMENTS

| 2,884,907 | A | | 5/1959 | Atchley | 121/46.5 |
|---|---|---|---|---|---|
| 3,081,787 | A | * | 3/1963 | Meulendyk | 137/83 |
| 3,223,103 | A | | 12/1965 | Trinkler | 137/83 |
| 3,272,077 | A | * | 9/1966 | Meulendyk et al. | 91/3 |
| 3,406,701 | A | * | 10/1968 | Meulendyk | 137/83 |
| 3,542,051 | A | | 11/1970 | McFadden et al. | 137/83 |
| 5,303,727 | A | | 4/1994 | Wilson et al. | 137/83 |

FOREIGN PATENT DOCUMENTS

| EP | 0 662 565 | 7/1995 |
|---|---|---|
| GB | 1 267 051 | 3/1972 |
| WO | WO 99/36720 | 7/1999 |

OTHER PUBLICATIONS

"Jet Pipe Servovalves", MOOG White Paper, pp. 1-20.
PCT International Search Report, mailed Jan. 29, 2007.
Written Opinion of the International Searching Authority, mailed Jan. 29, 2007.

* cited by examiner

Primary Examiner—Eric Keasel
Assistant Examiner—Craig Schneider
(74) Attorney, Agent, or Firm—BainwoodHaung

(57) ABSTRACT

A jet reflector servovalve includes a flexure tube and reflector that opposes a fluid nozzle and fluid receivers of the servovalve. During operation, the nozzle directs a pressurized fluid jet toward the reflector. The pressurized fluid travels within a second stage of the servovalve, toward the reflector. The reflector directs or reflects the fluid back toward the fluid receivers to adjust a position of a spool of the servovalve. The configuration of the reflector, the nozzle, and the receivers allows transmission of the pressurized fluid within the second stage of the servovalve and minimizes the necessity for multiple o-rings between the second stage of the servovalve and a torque motor of the servovalve, thereby reducing manufacturing costs of the servovalve.

20 Claims, 11 Drawing Sheets

METHODS AND APPARATUS FOR SPLITTING AND DIRECTING A PRESSURIZED FLUID JET WITHIN A SERVOVALVE

BACKGROUND

In general, servovalves convert relatively low power electrical control input signals into a relatively large mechanical power output. Typically, servovalves receive a pressurized fluid from a fluid source to control a corresponding fluid motor. For example, during operation, pressurized fluid enters the servovalve and, based upon the control input signals, drives the fluid motor to operate nozzles or other variable-geometry elements associated with the fluid motor. Conventional servovalves include jet deflector servovalves and jet pipe servovalves.

FIGS. 1 and 2 illustrate an example of a jet deflector servovalve 10. The jet deflector servovalve 10 includes a torque motor 12 having a flexure tube 14, an armature 16 coupled to the flexure tube 14, and coils 18 oriented in electrical communication with the armature 16. The flexure tube 14 includes a deflector 20 defining an aperture 22, the deflector 20 oriented between a nozzle 24 and a pair of receivers 26 (e.g., a first receiver 26-1 and a second receiver 26-2). The first receiver 26-1 orients in fluid communication with a first chamber 32 defined by a spool 34 of the servovalve 10, via a first fluid pathway 36. The second receiver 26-2 orients in fluid communication with a second chamber 38 defined by the spool 34, via a second fluid pathway 40. As shown in FIG. 2, the nozzle 24 orients substantially opposite to (e.g., opposing within the same plane) the first receiver 26-1 and the second receiver 26-2. The nozzle 24 and deflector 20 are configured to direct pressurized fluid 28 from a pressurized fluid source 30 toward the receivers 26-1, 26-2.

During operation, the motor 12 receives a control signal input and transmits the control signal to the coils 18. The coils 18, in turn, generate a torque on the armature 16 to rotate the flexure tube 14 and adjust a position of the deflector 20 relative to the first receiver 26-1 and the second receiver 26-2. For example, as indicated in FIG. 2, assume the deflector 20 positions along a –X direction 44. With such positioning, the aperture 22 defined by the deflector 20 directs the pressurized fluid 28 from the nozzle 24 toward the second receiver 26-2 and blocks the first receiver 26-1 from receiving the pressurized fluid 28. The second receiver 26-2, in turn, directs the pressurized fluid 28-2 toward the second chamber 38 via the second fluid pathway 40, thereby creating an increase in pressure within the second chamber 38. Returning to FIG. 1, the increased pressure within the second chamber 38 pushes the spool 34 along a +X direction 42, allowing the source pressurized fluid 28 to flow to a fluid motor via port 46 to operate the fluid motor.

FIG. 3 illustrates an example of a jet pipe servovalve 60. The typical jet pipe servovalve 60, for example, includes a torque motor 62 having a flexure tube 64, an armature 66 coupled to the flexure tube 64, and coils 68 oriented in electrical communication with the armature 66. The flexure tube 64 includes a fluid jet 70 that couples to a fluid source 72 via a fluid pathway 74. The fluid pathway 74 extends from a second stage portion 73 of the servovalve 60 to a torque motor portion 75 of the servovalve 60. The fluid pathway 74 extends though the second stage 73 of the servovalve and directs the pressurized fluid through a top portion 77 of the servovalve assembly 60 to the fluid jet 70. The torque motor portion 75 of the servovalve 60 includes an o-ring 90 and the second stage portion 73 of the servovalve 60 includes an o-ring 88 opposing the o-ring 90. The o-rings 88, 90 minimize leakage of the pressurized fluid between the second stage portion 73 and the torque motor portion 75 during operation.

The jet pipe servovalve 60 also includes a fluid receiver 76 (e.g., a first receiver 76-1 and a second receiver 76-2). The first receiver 76-1 orients in fluid communication with a first chamber 78 defined by a spool 80 of the servovalve 60, via a first fluid pathway 82. The second receiver 76-2 orients in fluid communication with a second chamber 84 defined by the spool 80, via a second fluid pathway 86. The fluid jet 70 is configured to receive pressurized fluid from the pressurized fluid source 72 and direct the fluid toward the receivers 76-1, 76-2. The pressurized fluid source 72 delivers the fluid to a jet pipe assembly is configured with the pipe receiving fluid from the pressurized fluid source via the top of the servovalve assembly requires multiple o-rings to minimize leakage of fluid.

During operation, the motor 62 receives a control signal input and transmits the control signal to the coils 68. The coils 88, in turn, generate a torque on the armature 66 to rotate the flexure tube 64 and adjust a position of the fluid jet 70 relative to the receivers 76-1, 76-2. Such positioning changes the pressure in the respective chambers 78, 80 to adjust a position of the spool 80 within the servovalve 60.

SUMMARY

Conventional techniques for directing a pressurized fluid from a fluid source toward a first stage of a servovalve, however, suffer from a variety of deficiencies.

As described above, the jet deflector servovalve 10 includes a deflector 20 oriented between a nozzle 24 and a pair of receivers 26 (e.g., a first receiver 26-1 and a second receiver 26-2). During operation, an aperture 22 defined by the deflector 20 directs pressurized fluid 28 from the nozzle 24 toward the first receiver 26-1 and the second receiver 26-2 to control a lateral position of the spool 34 of the servovalve 10. During operation, however, the pressurized fluid from the nozzle 24 generates a bending moment on the deflector 20 and the flexure element 14 in a direction oriented into and out of the page of FIG. 1. Over time, the bending moment can plastically deform the deflector 20, the flexure member 14, or both the deflector 20 and the flexure member 14. The plastic deformation changes the relative, null orientation of the deflector 20 relative to the first receiver 26-1 and the second receiver 26-2 (e.g., where the deflector 20 orients in a null position in response to receiving a zero current control signal from a controller). As such, the plastic deformation can adjust the accuracy of a pressure output of the servovalve 10 when the deflector 22 orients in a null position.

Also as described above, the jet pipe servovalve 60 includes a fluid jet 70 that couples to a fluid source 72 via a fluid pathway 74. The fluid pathway 74 extends from a second stage portion 73 of the servovalve 60 to a torque motor portion 75 of the servovalve 60. The fluid pathway 74 extends from the second stage 73 of the servovalve and directs the pressurized fluid through a top portion 77 of the servovalve assembly 60 to the fluid jet 70. In such a configuration, however, the jet pipe servovalve 60 requires multiple o-rings 88, 90 to minimize leakage of the pressurized fluid into the torque motor portion 75, thereby adding to the overall cost of manufacturing associated with the servovalve 60.

By contrast, embodiments of the present invention significantly overcome the described deficiencies and provide techniques for directing flow of a pressurized fluid within a servovalve. A jet reflector servovalve includes a flexure tube and reflector that opposes a fluid nozzle and fluid receivers of the servovalve. During operation, the nozzle directs a pressurized fluid jet toward the reflector. The pressurized fluid travels within a second stage of the servovalve, toward the reflector. The reflector directs or reflects the fluid back toward the fluid receivers to adjust a position of a spool of the servovalve. The configuration of the reflector, the nozzle, and the receivers allows transmission of the pressurized fluid within the second stage of the servovalve and minimizes or eliminates the necessity for multiple o-rings between the second stage of the servovalve and a torque motor of the servovalve, thereby reducing manufacturing costs of the servovalve.

Also, during operation, the nozzle directs the pressurized fluid jet toward the reflector along a flow path aligned with a long axis of the flexure tube. By delivering the fluid along the long axis of the flexure tube, the nozzle minimizes generation of a bending moment on the reflector and flexure tube. As such, the configuration of the reflector, the nozzle, and the receivers allows the reflector to maintain a null orientation, relative to the nozzle and receivers, in response to receiving a zero current control signal from a controller.

In one arrangement, a jet reflector assembly includes a jet-receiver valve having a fluid exchange surface defining a nozzle port, a first receiver port, and a second receiver port. The jet reflector assembly has a reflector having a reflector surface opposing the fluid exchange surface of the jet-receiver valve. The reflector surface is configured to reflect fluid transmitted from the nozzle port to the first receiver port and the second receiver port. The jet reflector assembly also has a controller. The controller is configured to position the reflector in a first position relative to the jet-receiver valve to reflect the fluid from the nozzle port to the first receiver port and to the second receiver port in substantially equal amounts. The controller is configured to position the reflector in a second position relative to the jet-receiver valve to reflect the fluid from the nozzle port to the first receiver port and to the second receiver port in substantially unequal amounts. The configuration of the reflector, the nozzle, and the receivers allows transmission of the pressurized fluid within the second stage of the servovalve and minimizes the necessity for multiple o-rings between the second stage of the servovalve and a torque motor of the servovalve.

In one arrangement, the reflector surface of the jet reflector assembly has a first reflector element opposing the first receiver port and a second reflector element opposing the second receiver port. The first reflector element and the second reflector element define substantially curved surfaces. The first reflective element is configured to align with the nozzle and substantially direct the fluid to the first receiver port when the reflector orients in a first non-null position. The second reflective element is configured to align with the nozzle and substantially direct the fluid to the second receiver port when the reflector orients in a second non-null position. The curved surfaces of the first reflector element and the second reflector element minimize turbulence or disruption (e.g., spraying) of the pressurized fluid when the fluid impacts the reflector. The curved surfaces of the reflector elements therefore, minimize a loss in pressure of the fluid as the reflector directs the fluid toward the first receiver port and the second receiver port.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention provide techniques for directing flow of a pressurized fluid within a servovalve. A jet reflector servovalve includes a flexure tube and reflector that opposes a fluid nozzle and fluid receivers of the servovalve. During operation, the nozzle directs a pressurized fluid jet toward the reflector. The pressurized fluid travels within a second stage of the servovalve, toward the reflector. The reflector directs or reflects the fluid back toward the fluid receivers to adjust a position of a spool of the servovalve. The configuration of the reflector, the nozzle, and the receivers allows transmission of the pressurized fluid within the second stage of the servovalve and minimizes or eliminates the necessity for multiple o-rings between the second stage of the servovalve and a torque motor of the servovalve, thereby reducing manufacturing costs of the servovalve.

Also, during operation, the nozzle directs the pressurized fluid jet toward the reflector along a flow path aligned with a long axis of the flexure tube. By delivering the fluid along the long axis of the flexure tube, the nozzle minimizes generation of a bending moment on the reflector and flexure tube. As such, the configuration of the reflector, the nozzle, and the receivers allows the reflector to maintain a null orientation, relative to the nozzle and receivers, in response to receiving a zero current control signal from a controller.

Figure 1:
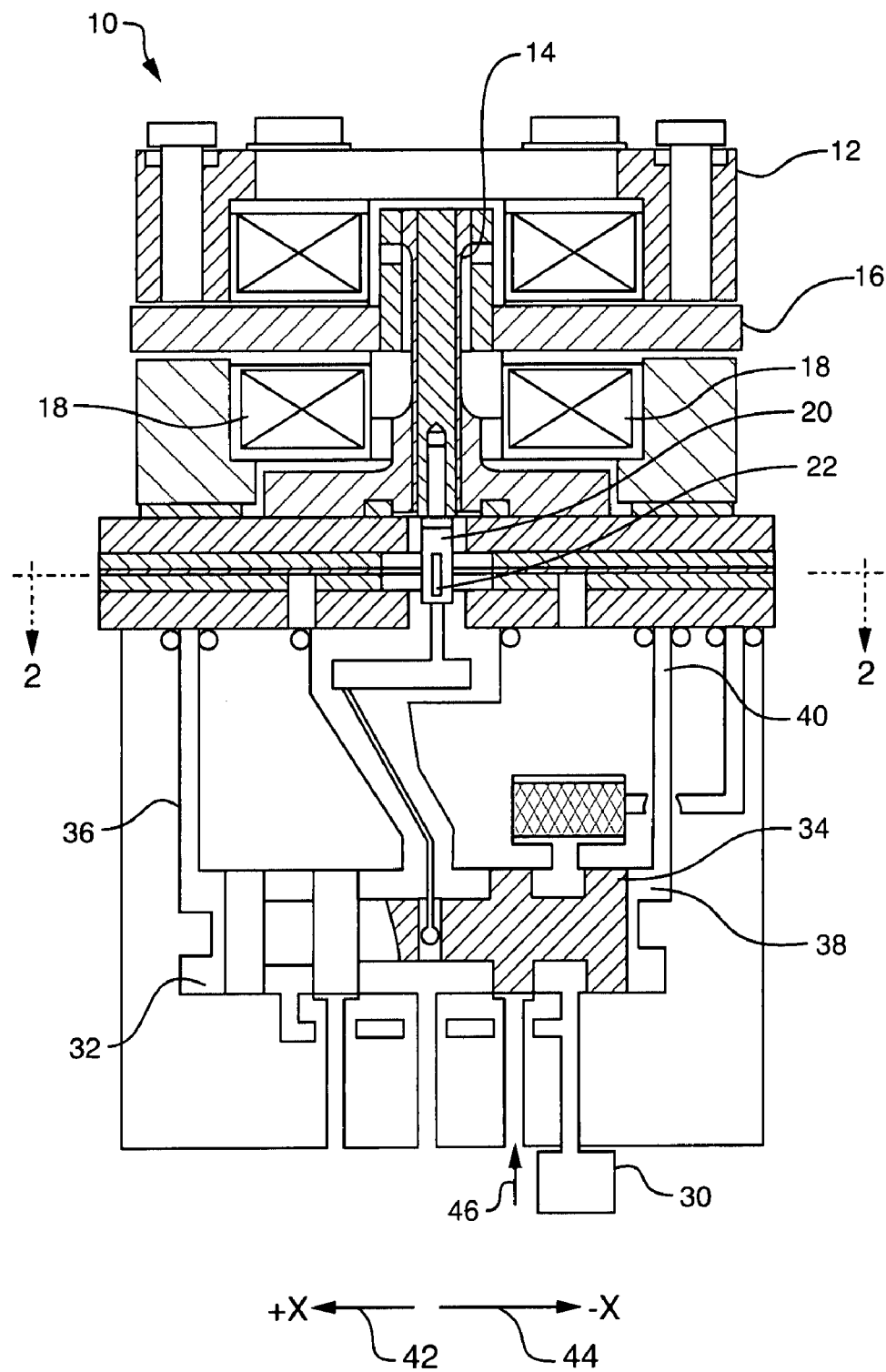
FIG. 1 is a schematic illustrating a side sectional view of a prior art jet deflector servovalve assembly.
Figure 2:
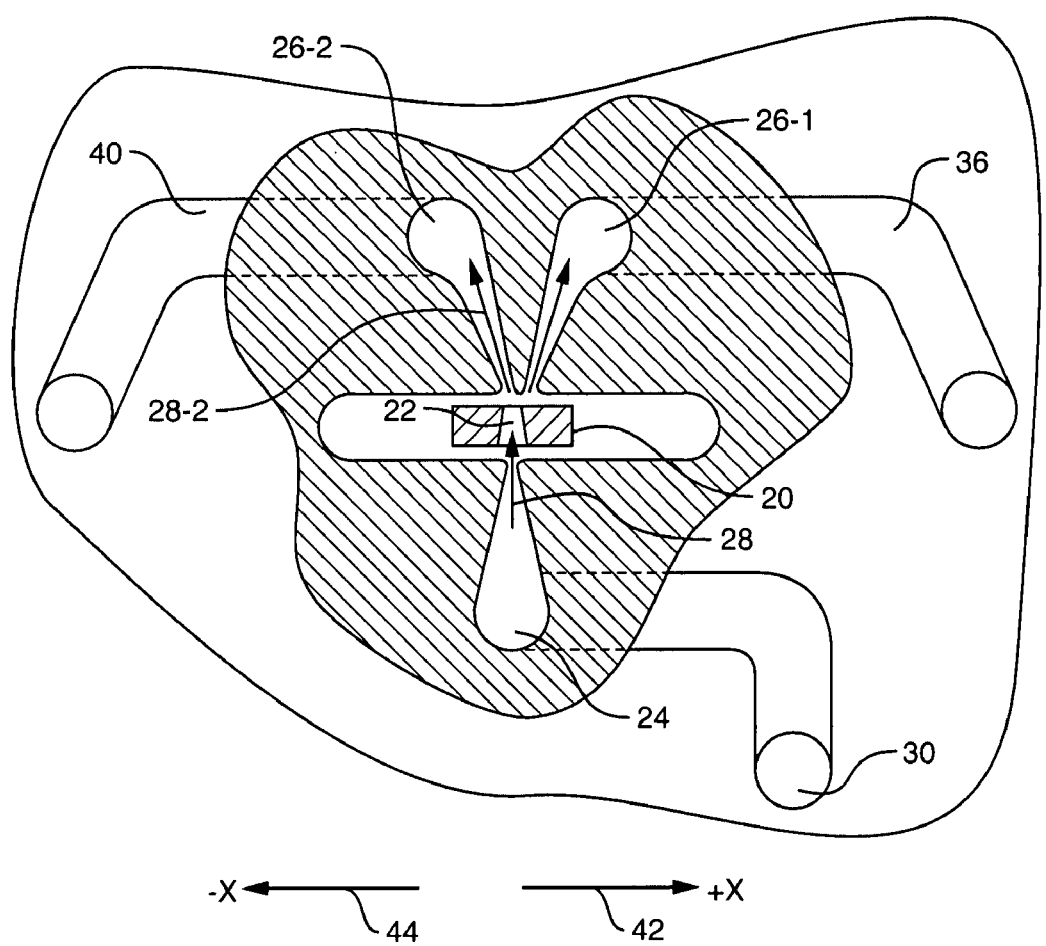
FIG. 2 is a schematic illustrating a top sectional view of the prior art jet deflector servovalve assembly of FIG. 1.
Figure 3:
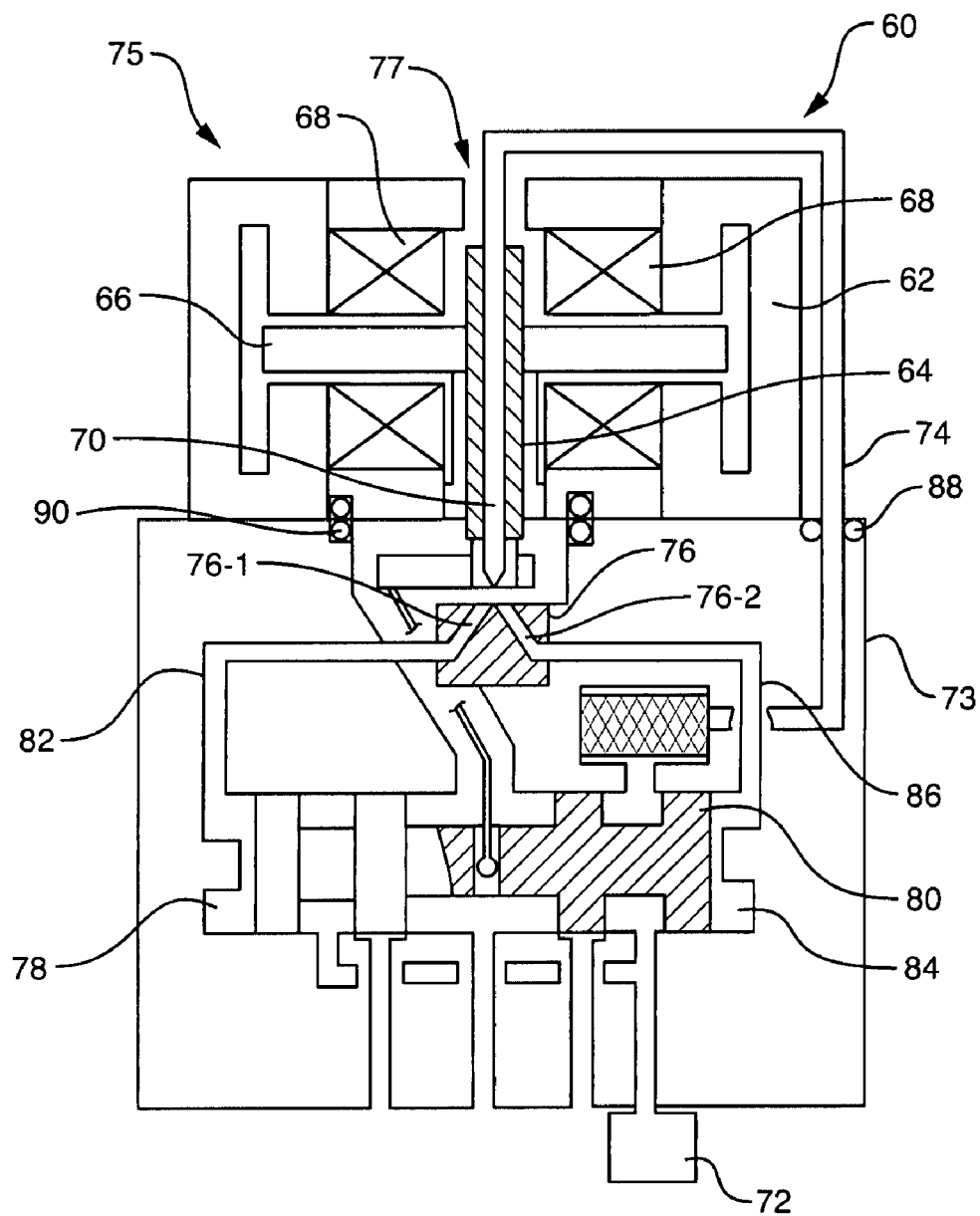
FIG. 3 is a schematic illustrating a side sectional view of a prior art jet pipe servovalve assembly.
Figure 4:
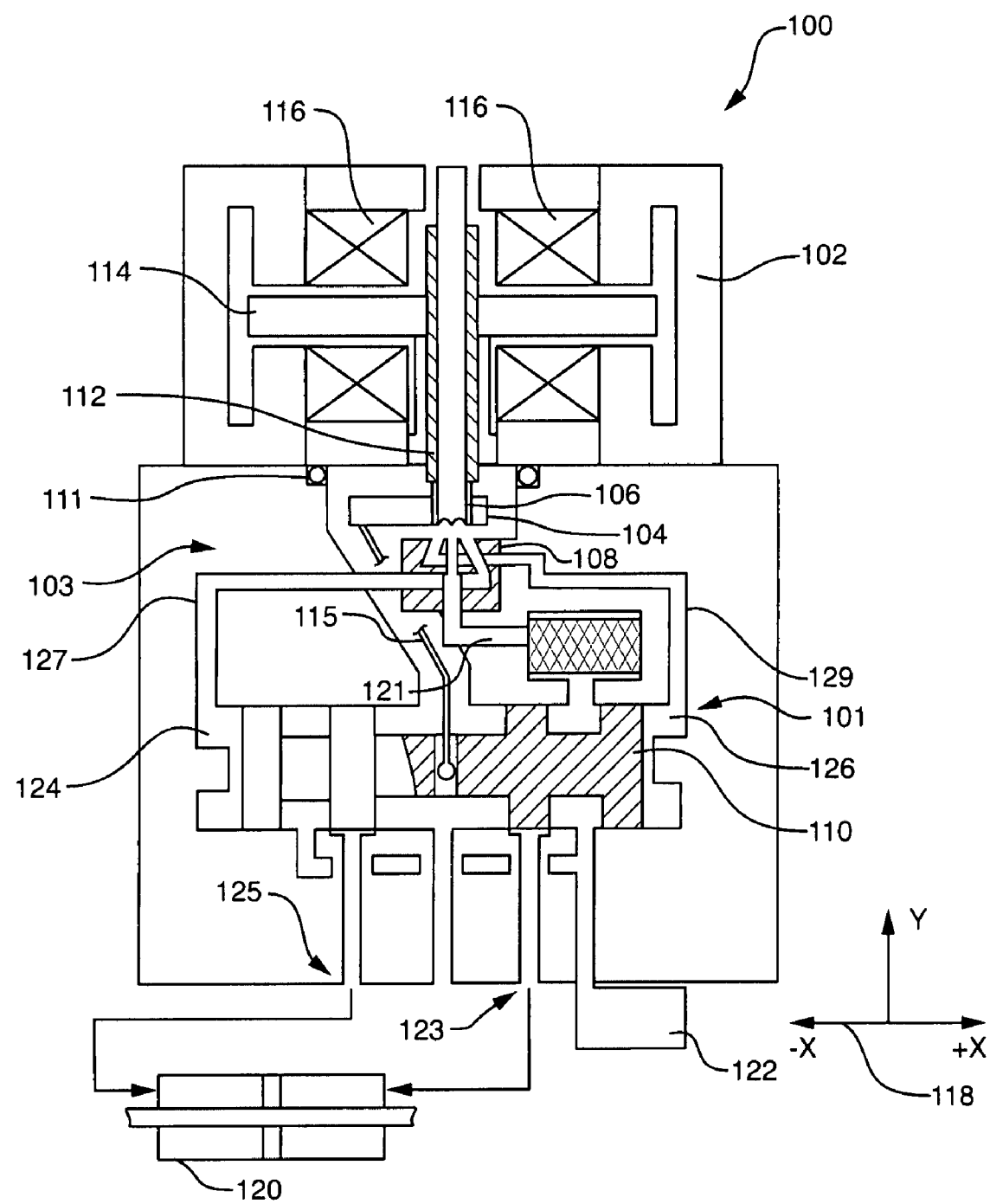
FIG. 4 is a schematic illustrating a side sectional view of a servovalve having a jet reflector assembly, according to one embodiment of the invention.

FIG. 4 shows a servovalve 100 (e.g., a jet reflector servovalve) having a torque motor 102 (e.g., a torque motor assembly), a first stage 103, and a second stage 101. The first stage 103 includes a jet reflector assembly 104 having a reflector 106 and a jet-receiver valve 108. The second stage 101 includes a spool 110 and sleeve where the spool 110 orients in fluid communication with the reflector assembly 104 of the first stage 103.

The torque motor 102 includes a controller or shaft 112, such as a flexure tube, an armature 114 coupled to the controller 112, and coils 116 oriented in electrical communication with the armature 114. The torque motor 102 and controller 112 are configured to position the reflector 106 relative to the jet-receiver valve 108 to control or adjust a lateral position of the spool 110 within the servovalve 100 (e.g., relative to an x-axis 118). Positioning of the spool 110, in turn, drives an associated fluid motor 120. The spool 110 couples to the reflector 106 of the jet reflector assembly 104 by a feedback mechanism 115 that is configured to generate a balancing torque on the reflector 106 and controller 112. For example, as the lateral position of the spool 110 changes during operation, the balancing torque generated by the feedback mechanism 115 orients the reflector 106 in a null or equilibrium position relative to the jet reflector assembly 104.

The second stage 101 of the servovalve 100 has a sealing element or o-ring 111 oriented between the torque motor 102 and the second stage 101. The o-ring 111 minimizes leakage of pressurized fluid from the second stage portion 101 of the servovalve 100 into the torque motor 102. The second stage 101 also includes a pressurized fluid conduit 121 configured to carry a pressurized fluid within the first stage from a pressurized fluid source 122 to the jet reflector assembly 104.

The jet reflector assembly 104 is configured to direct a fluid from the pressurized fluid source 122 toward a first chamber 124 defined by the spool 110 of the servovalve 100, via a first transmission conduit 127, and a second chamber 126 defined by the spool 110 of the servovalve 100, via a second transmission conduit 129. As such, the jet-receiver valve 108 and the reflector 106 work in conjunction with each other to allow for such fluid direction. The jet-receiver valve 108 is configured to transmit a pressurized fluid (e.g., a fluid jet) from the pressurized fluid source 122 toward the reflector 106. The reflector 106, in return, is configured to reflect or direct the fluid back toward the jet-receiver valve 108. The jet-receiver valve 108 is configured to receive the reflected fluid from the reflector and, depending upon an orientation of the reflector 106 relative to the jet-receiver valve 108, direct the fluid toward the first chamber 124 and the second chamber 126 in varying amounts to adjust the lateral position of the spool 110 within the servovalve 100.

Figure 5:
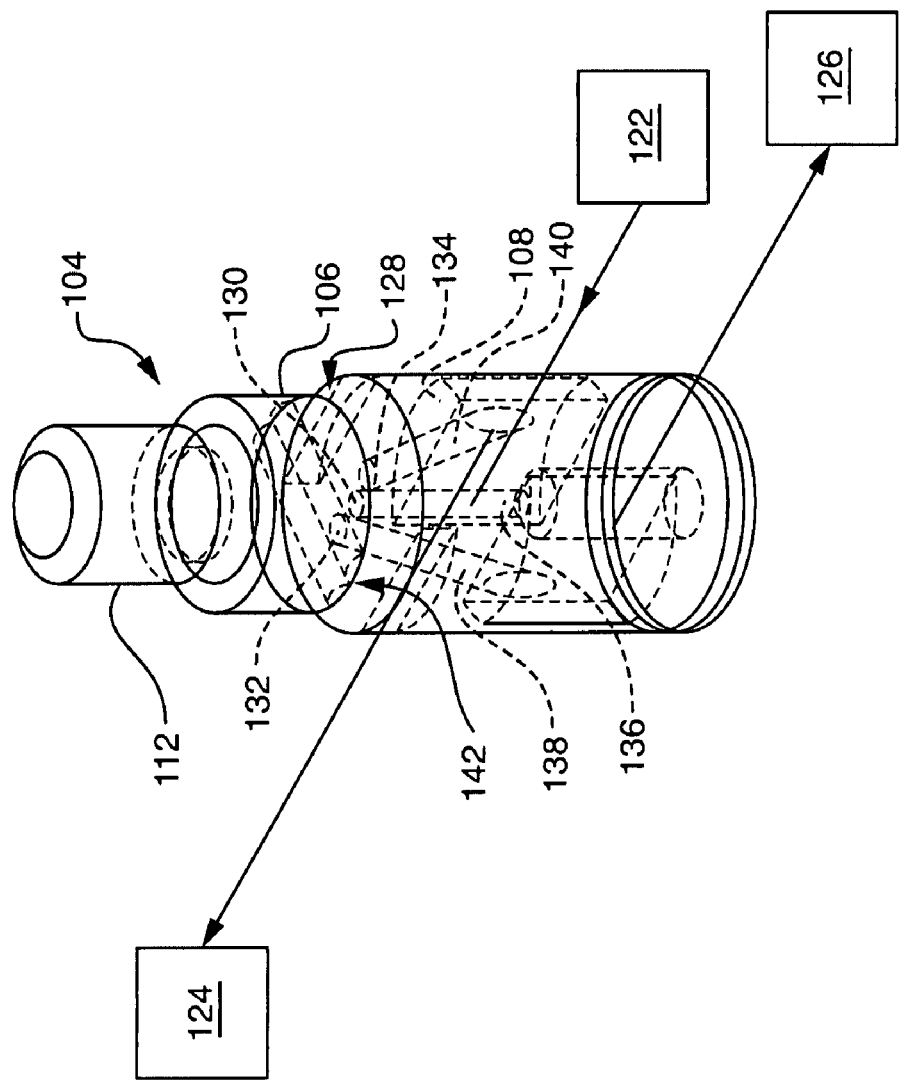
FIG. 5 illustrates a perspective view of the jet reflector assembly of FIG. 4 according to one embodiment of the invention.
Figure 6:
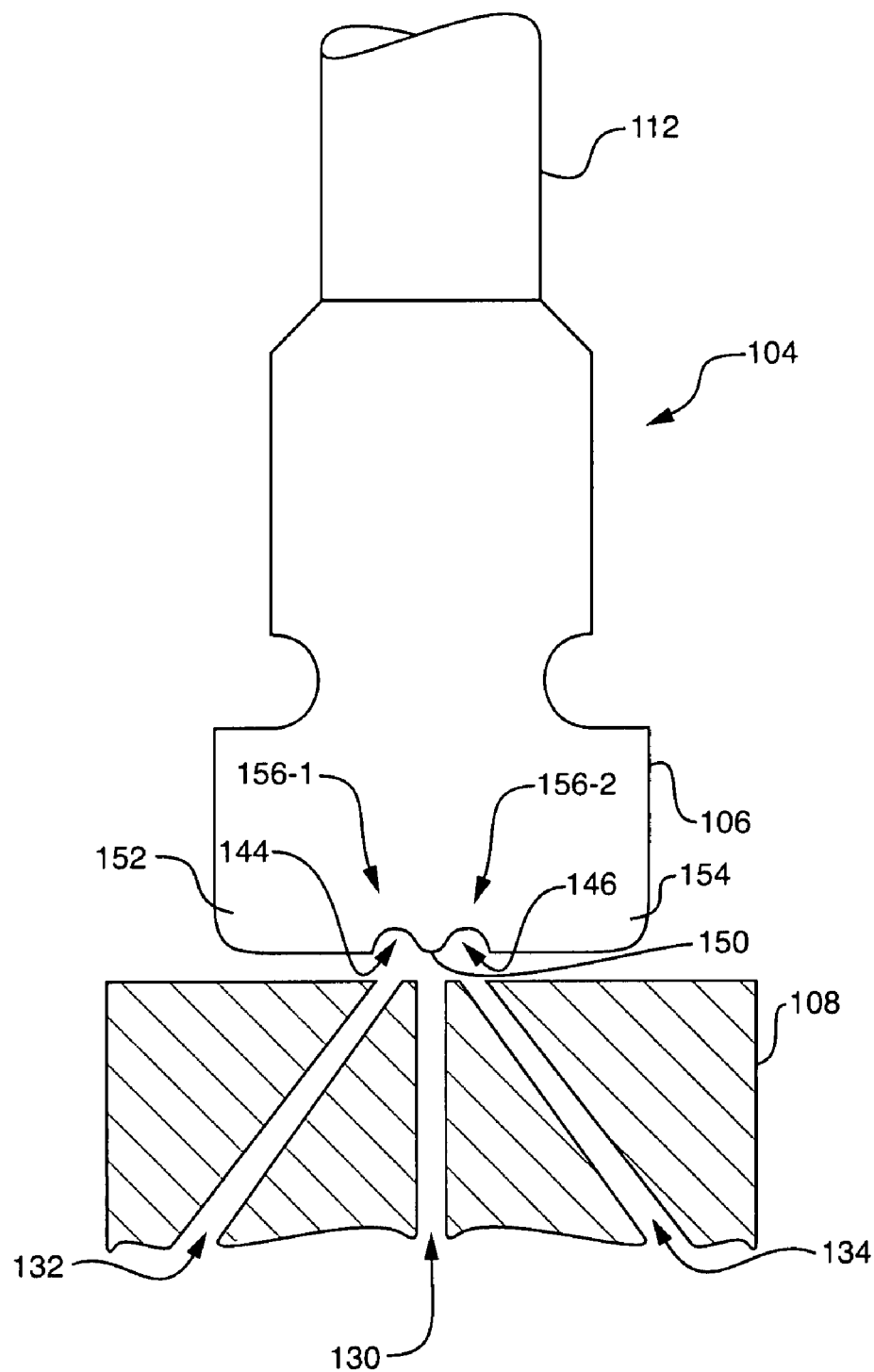
FIG. 6 illustrates a perspective view of the jet reflector assembly of FIG. 4 according to one embodiment of the invention.

FIGS. 5 and 6 illustrate details of an arrangement of the jet-receiver valve 108 and reflector 106 of the jet reflector assembly 104.

The jet-receiver valve 106 includes a fluid exchange surface 128 that defines a nozzle port 130, a first receiver port 132, and a second receiver port 134. In one arrangement, the fluid exchange surface 128 is a substantially planar surface that orients the nozzle port 130, first receiver port 132, and second receiver port 134 as substantially coplanar (e.g., within the same plane).

The nozzle port 130 includes a nozzle 136 that provides fluid communication with the pressurized fluid source 122. The nozzle port 130 and nozzle 136 are configured to direct the pressurized fluid, from the pressurized fluid source 122, as a jet having a flow direction substantially orthogonal to the planar fluid exchange surface 128 (e.g., orthogonal to the first receiver port 132 and the second receiver port 134). The first receiver port 132 includes a first receiver 138 configured to deliver the pressurized fluid to the second chamber 126 of the servovalve 100. The second port 134 includes a second receiver 140 configured to deliver the pressurized fluid to the first chamber 124 of the servovalve 100.

The reflector 106 has a reflector surface 142 opposing the fluid exchange surface 128 of the jet-receiver valve 108. As such, the reflector surface opposes the nozzle port 130, the first receiver port 132, and the second receiver port 134. In one arrangement, the reflector surface 142 is configured as a substantially planar surface opposing the substantially planar fluid exchange surface 128 of the jet-receiver valve 108. The reflector surface 142 is configured to reflect the fluid transmitted from the nozzle port 130 to the first receiver port 132 and the second receiver port 134. For example, when reflector surface 142 receives the fluid transmitted from the opposing fluid exchange surface 128 (e.g., from the nozzle port 130) the reflector surface 142 "reflects" the fluid to the first receiver port 132 and the second receiver port 134 by directing the fluid back toward the fluid exchange surface 128.

The reflector 106 couples to the controller 112. Positioning of the controller 112 by the torque motor 102 adjusts a position of the reflector 106 relative to the jet-receiver valve 108. Positioning of the reflector 106, as will be described below, adjusts the amount of fluid directed toward the first receiver port 132 and the second receiver port 134 to control the lateral position of the spool 110 within the servovalve 100.

FIG. 6 illustrates a sectional side view of the jet reflector assembly 104 illustrated in FIG. 5. The reflector 106 includes a first reflector element 144, a second reflector element 146, a flow splitter element 150, a first blocking element 152 and a second blocking element 154.

The first 144 and second 146 reflector elements are configured to direct fluid flow, received from the nozzle port 130, to the first receiver port 132 and the second receiver port 134. For example, as illustrated, the first reflector element 144 orients opposite to (e.g., opposes) the first receiver port 132 and the second reflector element 146 orients opposite to (e.g., opposes) the second receiver port 134. As will be described below, positioning of the first reflector element 144 and the second reflector element 146 relative to the nozzle port 130 of the jet-receiver valve 106 adjusts an amount or volume of fluid directed, by the reflector elements 144, 146 toward the first receiver port 132 and the second receiver port 134.

The first reflector element 144 and the second reflector element 146, in one arrangement, are configured as substantially curved surfaces 156-1, 156-2 defined by the reflector 106. The curved surfaces 156-1 and 156-2 of the reflector surface (e.g., the curvature of the elements 144, 146) redirect a flow of pressurized fluid, transmitted from the nozzle port 130, toward the receiver ports 132, 134. The curved configuration of the first reflector element 144 and the second reflector element 146 minimizes turbulence or disruption (e.g., spraying) of the pressurized fluid when the fluid impacts the reflector 106. The curved surfaces 156-1, 156-2 of the reflector elements 144, 146, therefore, help to maintain a pressure of the pressurized fluid as the reflector 106 directs the fluid toward the first receiver port 132 and the second receiver port 134.

The flow splitter element 150 is configured to reflect fluid from the nozzle port 130 to the first receiver port 132 and to the second receiver port 134 in substantially equal amounts or volumes when the reflector 106 orients in an equilibrium position or a null position relative to the jet-receiver valve 108. As the first receiver port 132 and the second receiver port 134 receive and deliver the substantially equivalent volumes of fluid to the chambers 126, 124 within the servovalve 100, the substantially equivalent volumes of fluid maintain substantially equivalent pressures within the chambers 126, 124. The flow splitter element 150 allows the jet-reflector valve 104 to maintain a position of the spool 110 within the servovalve 10, such as a null position, during operation.

The flow splitter element 150 is also configured to substantially cover or block the receiver ports 132, 134 when the reflector 106 orients in a non-null position. The flow splitter element 150 is configured to substantially cover (e.g., substantially align with) or block the first receiver port 132 when the reflector 106 orients in a first, non-null position relative to the jet-receiver valve 108. In such an orientation, the flow splitter element 150 minimizes flow of fluid, as transmitted from the nozzle port 130 to the reflector 106, from the reflector 106 to the first receiver port 132. The flow splitter element 150 is configured to substantially cover (e.g., substantially align with) or block the second receiver port 134 when the reflector 106 orients in a second, non-null position relative to the jet-receiver valve 108. In such an orientation, the flow splitter element 150 minimizes flow of fluid, as transmitted from the nozzle port 130 to the reflector 106, from the reflector 106 to the second receiver port 134.

Figure 7:
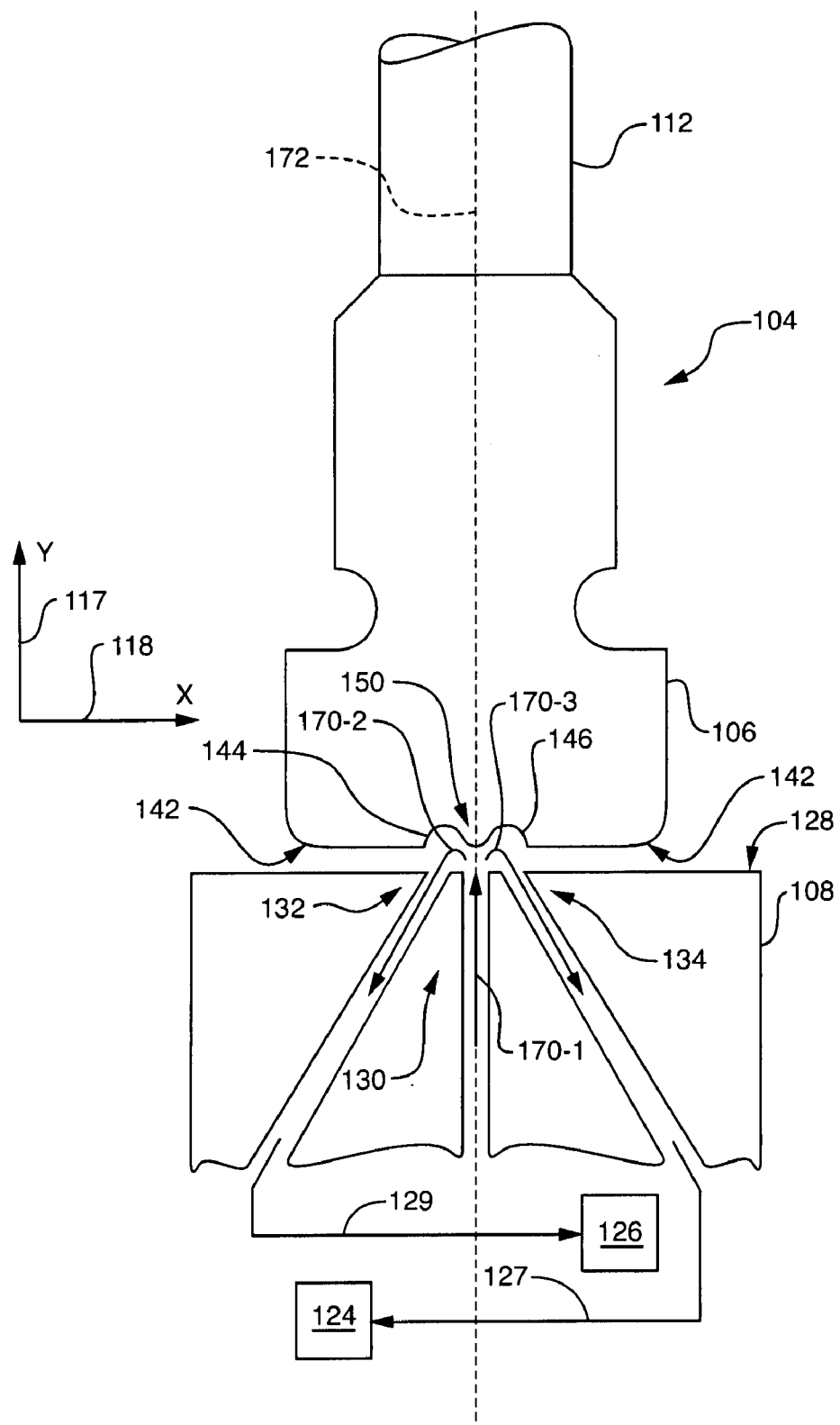
FIG. 7 illustrates operation of the jet reflector assembly of FIG. 4 when a reflector of the jet reflector assembly orients in a substantially null position relative to a jet-receiver valve of the jet reflector assembly, according to one embodiment of the invention.
Figure 8:
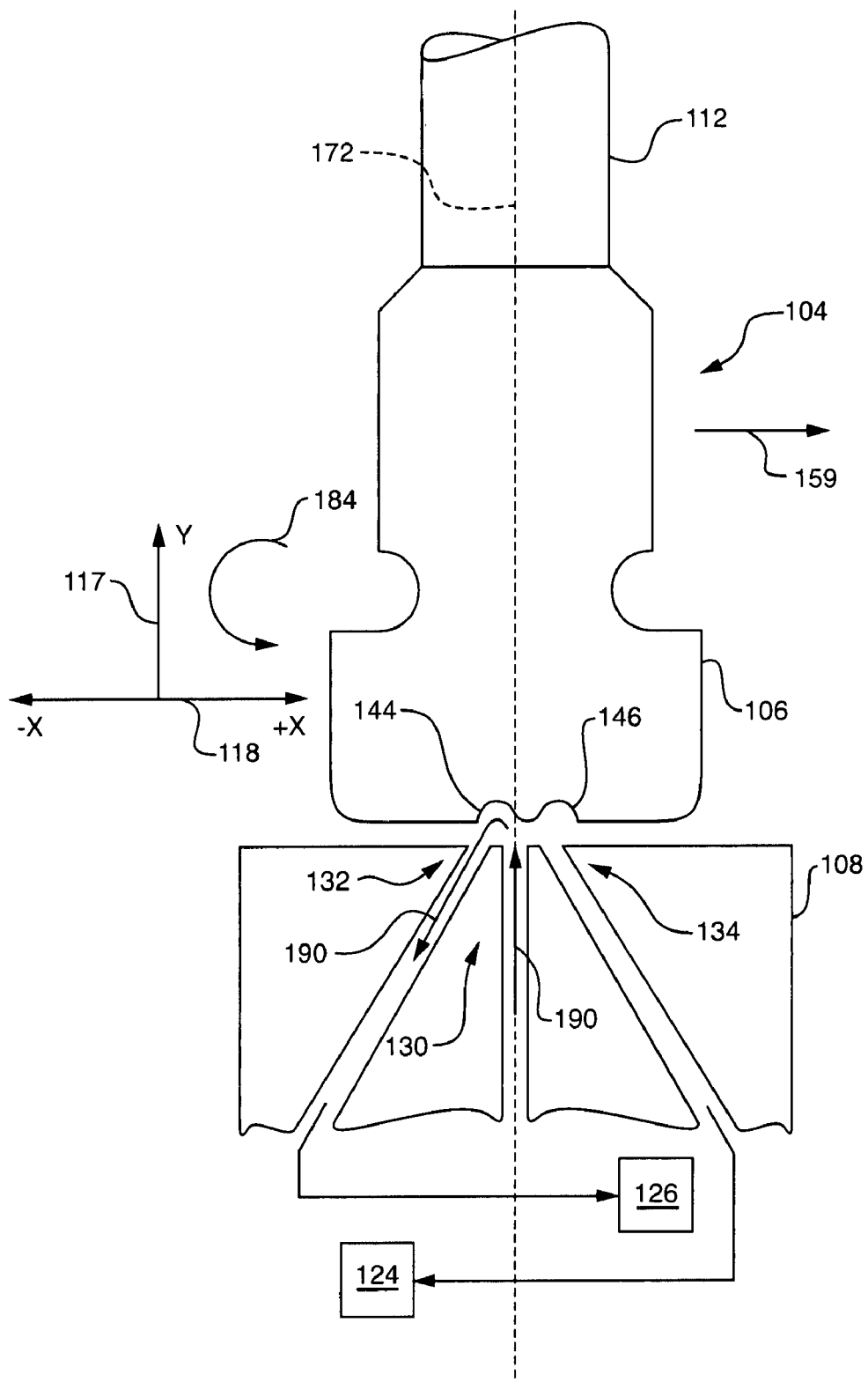
FIG. 8 illustrates operation of the jet reflector assembly of FIG. 4 when a reflector of the jet reflector assembly orients in a first non-null position relative to a jet-receiver valve of the jet reflector assembly, according to one embodiment of the invention.
Figure 9:
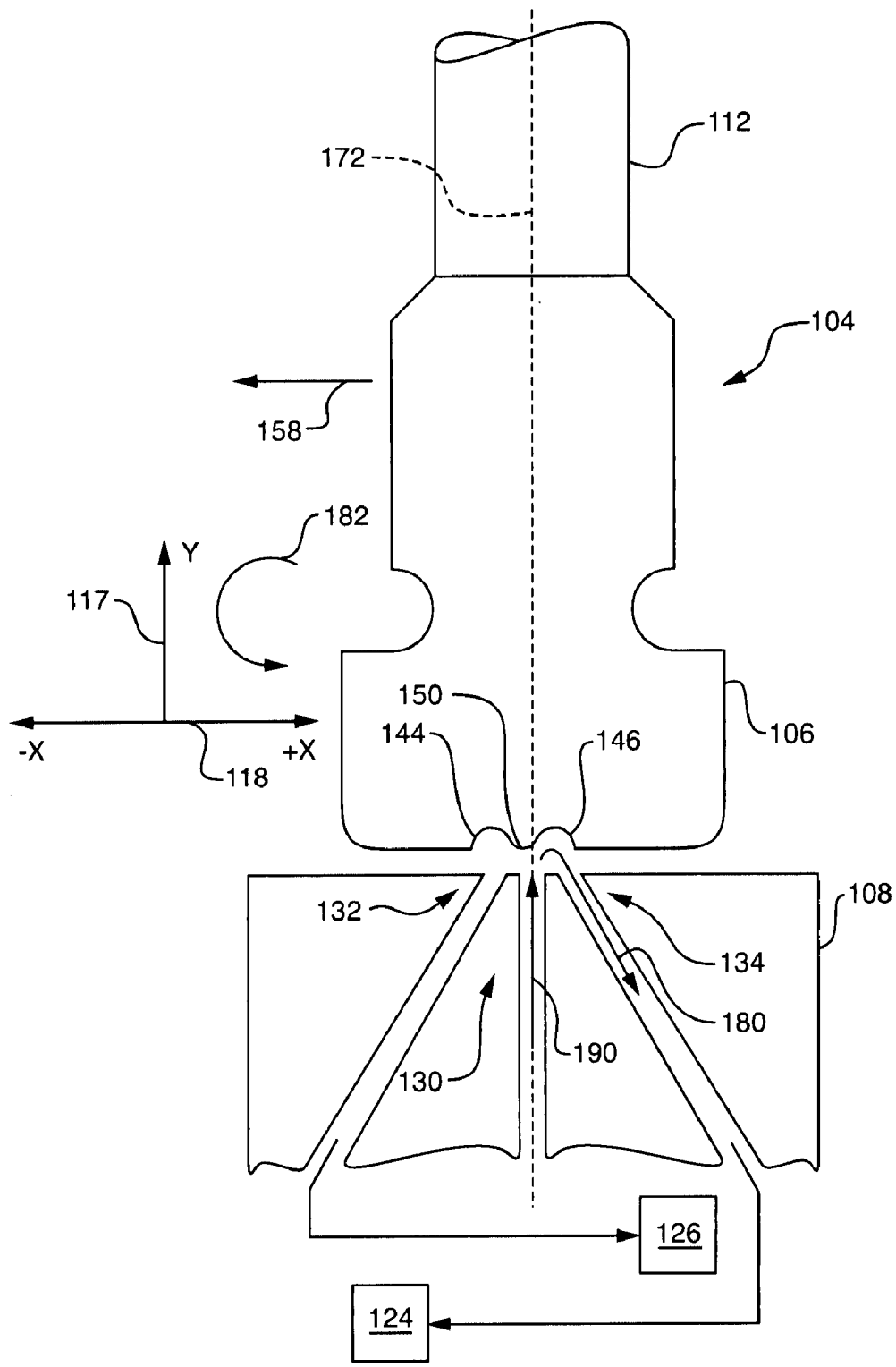
FIG. 9 illustrates operation of the jet reflector assembly of FIG. 4 when a reflector of the jet reflector assembly orients in a second non-null position relative to a jet-receiver valve of the jet reflector assembly, according to one embodiment of the invention.

FIGS. 7-9 illustrate operation of the jet reflector assembly 104, according to one arrangement. Description of the operation of the jet reflector assembly 104 is provided with reference to elements illustrated FIG. 4.

In FIG. 7, the torque motor 102 and the controller 112 orient the reflector 106 in a substantially null position relative to the jet-receiver valve 108. When oriented in the null position, as the nozzle port 130 directs pressurized fluid 170-1 toward the reflector 106 (e.g., toward the reflector surface 142 of the reflector 106), the reflector 106 reflects substantially equal amounts of fluid 170-2, 170-3 back to the first receiver port 132 and to the second receiver port 134 of the jet-receiver valve 108.

For example, in one arrangement, when the reflector 106 orients in the null position, the flow splitter element 150 aligns with the nozzle port 130 of the jet-receiver valve 108, the first reflector element 144 aligns with the first receiver port 132, and the second reflector element 146 aligns with the second receiver port 134. As the pressurized fluid 170-1 flows from the nozzle port 130 (e.g., in a flow direction opposing the fluid exchange surface 128) and contacts the flow splitter element 150, the flow splitter element 150 divides the fluid or flow stream 170-1 into a first flow stream 170-2 and a second flow stream 170-3. The flow splitter element 150 divides the flow stream 170-1 such that an amount or volume of fluid within the first flow stream 170-2 is substantially equal to an amount or volume of fluid within the second flow stream 170-3 (e.g., at an instant of time).

The flow splitter element 150 directs the first flow stream 170-2 to the first reflector element 144 and directs the second flow stream 170-3 to the second reflector element 146. The first reflector element 144 and the second reflector element 146 direct, respectively, the first flow stream 170-2 and the second flow stream 170-3 toward the planar fluid exchange surface 128. With the first reflector element 144 aligned with the first receiver port 132, the first reflector element 144 directs the first flow stream 170-2 to the first receiver port 132. Also, with the second reflector element 146 aligned with the second receiver port 134, the second reflector element 146 directs the second flow stream 170-3 to the second receiver port 134. The first 132 and second 134 receiver ports transmit the flow streams 170-2, 170-3 to the corresponding second chamber 126 and first chamber 124 of the servovalve 100. With the reflector 106 providing approximately equivalent volumes of fluid 170-2, 170-3 to the chambers 126, 124 of the servovalve when the reflector 106 orients in a substantially null position relative to the jet-receiver valve 108, the jet reflector assembly 104 maintains substantially equal pressures within the first chamber 124 and the second chamber 126 to maintain lateral positioning of the spool 110 within the servovalve 100.

While FIG. 7 illustrates the torque motor 102 and the controller 112 orienting the reflector 106 in a null position, additionally, the torque motor 102 and the controller 112 also orient the reflector 106 in a substantially non-null position relative to the jet-receiver valve 108. With such orientation, the reflector 106 reflects fluid 170, transmitted from the nozzle port 130, to the first receiver port 132 and to the second receiver port 134 in substantially unequal amounts. For example, the controller 112 positions the reflector 106 such that the reflector directs substantially all of the fluid transmitted from the nozzle port 130 such that the controller 112 directs approximately the entire volume of fluid to either the first receiver port 130 or the second receiver port 134. As a result, and as described below, jet reflector assembly 104 adjusts a position of the spool 110 within the servovalve 100.

FIG. 8 illustrates the torque motor 102 and the controller 112 orienting the reflector 106 in a first non-null position relative to the jet-receiver valve 108. For example, as the torque motor 102 receives a second current input through the coil 116, the coil rotates the armature 114 of the motor 102 in a counterclockwise direction 184 (relative to a Cartesian coordinate system having a Y-axis 117 and an X-axis 118). The armature 114, in turn, displaces the controller 112 and reflector 106 along the +X-axis direction. As the controller 112 moves 159 the reflector 106 along the +X-axis direction, the controller 112 aligns the first reflector element 144 with the nozzle port 130 and aligns the flow splitter element 150 with the second receiver port 134. With such alignment, as the nozzle port 130 transmits fluid 190 to the reflector 106, the first reflector element 144 reflects or redirects the fluid 190 to the first receiver port 132 while the position of the flow splitter element 150 substantially covers or blocks the second receiver port 134 to minimize or limit entry of the fluid 190 into the second receiver port 134.

By directing the substantially the entire volume of fluid 190 from the nozzle port 130 toward the first receiver port 132, the reflector 106 (e.g., the first reflector element 144 of the reflector 106) increases a pressure within the second chamber 126 of the servovalve 100. As indicated in FIG. 4, an increase in the pressure within the second chamber 126 positions the spool 110 along a −X-axis direction to a command position. In the command position, the spool 110 allows the pressurized fluid from the pressurized fluid source 122 to flow through the second exit port 125 to the fluid motor 120 to actuate a load coupled to the fluid motor 120. As the spool 110 moves along the −X-axis direction to the command position, the feedback mechanism 115 creates a balancing torque on the reflector 106 and controller 112, thereby returning the reflector 106 and controller 112 in an equilibrium position while the spool 110 maintains the command position.

FIG. 9 illustrates the torque motor 102 and the controller 112 orienting the reflector 106 in a second non-null position relative to the jet-receiver valve 108. For example, as the torque motor 102 receives a first current input through the coil 116, the coil rotates the armature 114 of the motor 102 in a clockwise direction 182 (relative to a Cartesian coordinate system having a Y-axis 117 and an X-axis 118). The armature 114, in turn, displaces the controller 112 and reflector 106 along the −X-axis direction. As the controller 112 moves 158 the reflector 106 along the −X-axis direction, the controller 112 aligns the second reflector element 146 with the nozzle port 130 and aligns the flow splitter element 150 with the first receiver port 132. With such alignment, as the nozzle port 130 transmits fluid 180 to the reflector 106, the second reflector element 144 receives the fluid and reflects or redirects the fluid 180 to the second receiver port 134 while the position of the flow splitter element 150 substantially covers the first receiver port 132 to minimize or limits entry of the fluid 180 into the first receiver port 132.

By directing the substantially the entire volume of fluid 180 from the nozzle port 130 and toward the second receiver port 134, the reflector 106 (e.g., the second reflector element 146 of the reflector 106) increases a pressure within the first chamber 124. As indicated in FIG. 4, an increase in the pressure within the first chamber 124 positions the spool 110 along a +X-axis direction to a command position. In the command position, the spool 110 allows the pressurized fluid from the pressurized fluid source 122 to flow through the first exit port 123 to the fluid motor 120 to actuate a load coupled to the fluid motor 120. As the spool 110 moves along the +X-axis direction to the command position, the feedback mechanism 115 creates a balancing torque on the reflector 106 and controller 112, thereby returning the reflector 106 and controller 112 in an equilibrium position while the spool 110 maintains the command position.

The configuration of the reflector 106, the nozzle port 130, and the receiver ports 132, 134 allows the servovalve 100 to carry the pressurized fluid within the second stage 101 of the servovalve 100, rather than requiring the servovalve to direct the pressurized fluid through the torque motor assembly, as required in a conventional jet pipe servovalve. With the pressurized fluid substantially contained within the second stage 101 of the servovalve 100 during operation, the servovalve 100 requires a minimal number of sealing elements between the torque motor assembly 102 and the second stage 101 of the servovalve 100. For example, as illustrated in FIG. 4, the servovalve 100 includes a single o-ring 111 oriented between the torque motor 102 and the second stage 101 of the servovalve 100. Compared to a conventional jet valve assembly requiring multiple sealing elements or o-rings between the torque motor and the second stage of the servovalve, the configuration of the jet reflector assembly 104 minimizes the number of sealing elements between the torque motor assembly 102 and the second stage 101 of the servovalve 100, thereby reducing the manufacturing cost of the servovalve 100.

As indicated in FIGS. 7-9, during operation, the nozzle port 130 directs the pressurized fluid toward the reflector 106. For example, as illustrated, the nozzle port 130 directs the pressurized fluid 170-1 toward the reflector 106 such that the fluid 170-1 exits the nozzle port 130 along an axis that is substantially perpendicular with the planar fluid exchange surface 128 and that is directed along, or substantially aligned with, a long axis 172 of the reflector 106 and the controller 112. With reference to FIGS. 7-9, the configuration of the reflector 106, the nozzle port 130, and the receiver ports 132, 134 minimizes generation of a bending moment on the reflector 106 and controller 112 along a z-axis (e.g., into and out of the page). With the direction of fluid travel substantially aligned with the long axis 172 of the reflector 106 and controller 112, the relative orientation of the jet-reflector valve 108 and reflector 106 limits generation of a plastic deformation on the reflector 106 and controller 172 along the z-axis. As such, the relative orientation of the jet-reflector valve 108 and reflector 106 minimizes changes to a null positioning of the reflector 106 relative to the jet-receiver valve 108, thereby limiting changes or inaccuracies in the pressure output of the servovalve 100 when the reflector orients in a null position.

As indicated above, the first reflector element 144 and the second reflector element 146 of the reflector 106 are configured as substantially curved surfaces 156-1, 156-2. The curved surfaces 156-1, 156-2 of the reflector elements 144, 146 minimize turbulence or disruption of the pressurized fluid when the fluid impacts the reflector. Additionally, the actual geometric configuration of the curved surfaces 156-1, 156-2 affects the performance of the servovalve 100.

Figure 10:
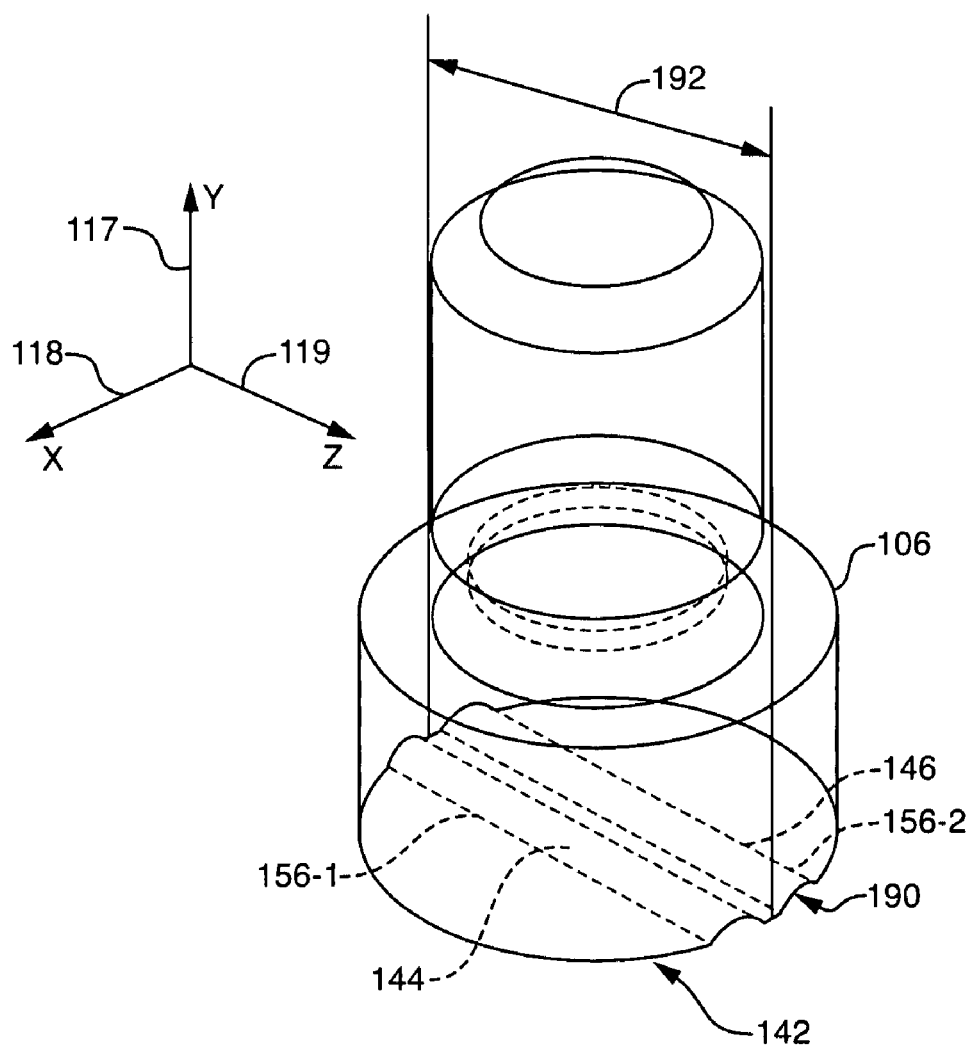
FIG. 10 illustrates a geometric configuration of the reflector elements of the jet reflector assembly of FIG. 4, according to one embodiment of the invention.

FIG. 10 illustrates the curved surfaces 156-1, 156-2 as cylindrically shaped troughs 190 defined by the reflector 106 and extending along a length 192 of the reflector surface 142. For example, extension of the curved surfaces 156-1, 156-2 of the reflector elements 144, 146 along the reflector surface 142 (e.g., along a z-axis 119), forms half-pipe shaped troughs 190. The half-pipe trough shape 190 of the reflector elements 144, 146 allows the reflector 106 to redirect a relatively large volume of fluid, directed from the nozzle port 130, to the receiver ports 132, 134.

For example, assume the reflector 106 orients in a null position relative to a jet-reflector valve 108. Further assume a nozzle port 130 of the jet-reflector valve 108 transmits a pressurized fluid to the reflector 106 such that the fluid flows toward the reflector 106 along both the y-axis 117 and the z-axis 119 (e.g., the flow includes both y-axis 117 and z-axis 119 flow components). In such an arrangement, with the curved surfaces 156-1, 156-2 configured as half-pipe shaped troughs 190, the reflector 106 redirects both the y-axis 117 and z-axis 119 flow components of the pressurized fluid toward the receiver ports 132, 134. The reflector 106, therefore, reflects a substantially large portion of the pressurized fluid from the nozzle port 130 toward the receiver ports 132, 134 and minimizes losses in efficiency in the servovalve 100 caused by the pressurized fluid having both y-axis 117 and z-axis 119 flow components.

Figure 11:
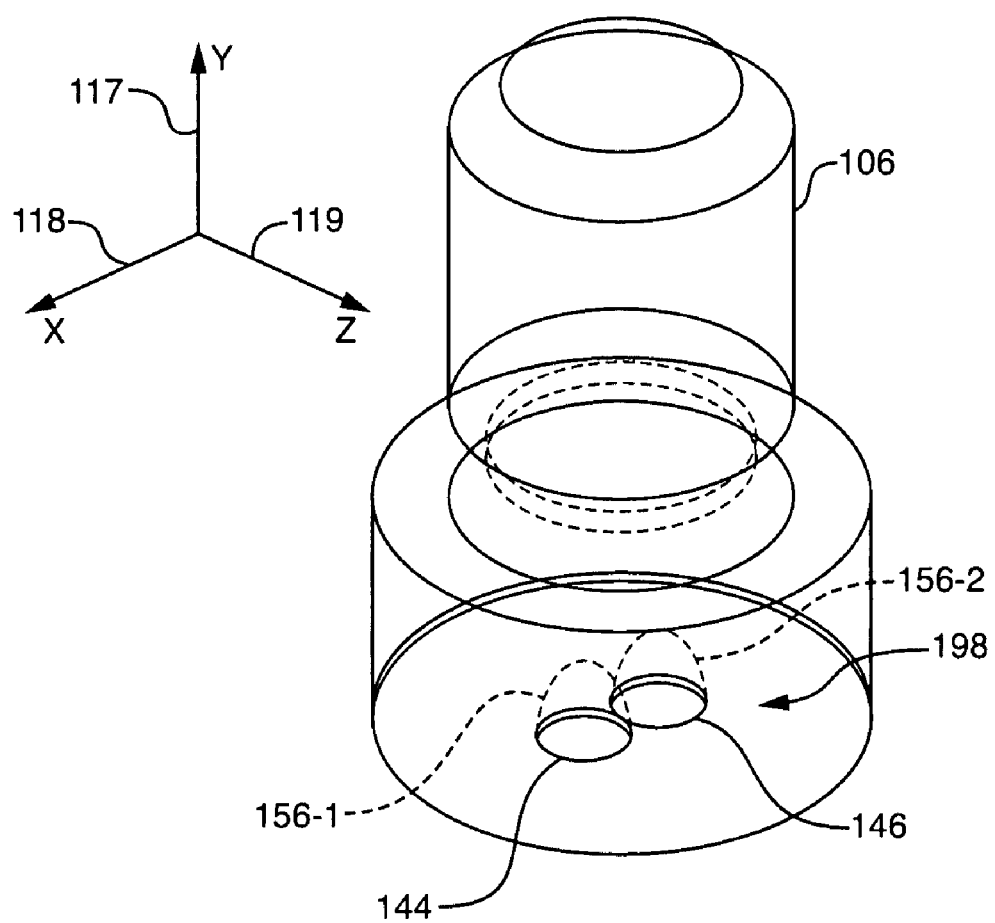
FIG. 11 illustrates a geometric configuration of the reflector elements of the jet reflector assembly of FIG. 4, according to another embodiment of the invention.

FIG. 11 illustrates the reflector 106 defining the curved surfaces 156-1, 156-2 as hemispherically shaped curved surfaces 198. During operation the hemispherically shaped curved surfaces 198 receive a pressurized fluid from the nozzle port 130. The hemispherically shaped curved surfaces 198 provide a substantially focused or narrow redirection of the pressurized fluid to the receiver ports 132, 134.

For example, assume the reflector 106 orients in a null position relative to a jet-reflector valve 108. Further assume a nozzle port 130 of the jet-reflector valve 108 transmits a pressurized fluid to the reflector 106 such that the fluid flows toward the reflector 106 along both the y-axis 117 and the z-axis 119 (e.g., the flow includes both y-axis 117 and z-axis 119 flow components). In such an arrangement, with the curved surfaces 156-1, 156-2 configured as hemispherically shaped surfaces 198, the reflector 106 substantially redirects the y-axis 117 flow component of the pressurized fluid toward the receiver ports 132, 134 and minimizes redirection of the z-axis 119 flow component toward the receiver ports 132, 134. The reflector 106, therefore, substantially maintains a velocity of the pressurized fluid (e.g. the pressurized fluid jet) transmitted from the nozzle port 130 and received by the receiver ports 132, 134.

While this invention has been particularly shown and described with references to preferred embodiments thereof, it will be understood by those skilled in the art that various changes in form and details may be made therein without departing from the spirit and scope of the invention as defined by the appended claims.

For example, as described above, the curved surfaces 156-1 and 156-2 defined by the reflector 106 are configured as having substantially similar geometries. As illustrated in FIG. 10 both of the curved surfaces 156-1, 156-2 defined by the reflector 106 are configured as cylindrically shaped troughs 190 that extending along a length 192 of the reflector surface 142. As illustrated in FIG. 11, both of the curved surfaces 156-1 and 156-2 are configured as hemispherically shaped curved surfaces 198. Such illustrations are by way of example only. In one arrangement, the curved surfaces 156-1, 156-2 defined by the reflector 106 are configured as having substantially different geometries. For example, in one arrangement, the first curved surface 156-1 of the reflector 106 is configured as a half-pipe shaped trough 190 while the second curved surface 156-2 is configured as a hemispherically shaped curved surface 198. With the curved surfaces 156-1, 156-2 configured with differing geometries a manufacturer can customize or adjust a performance criterion (e.g., pressure output) of the servovalve 100.

What is claimed is:

1. A jet reflector assembly comprising:
   a jet-receiver valve having a fluid exchange surface defining a nozzle port, a first receiver port, and a second receiver port;
   a reflector having a reflector surface opposing the fluid exchange surface of the jet-receiver valve, the reflector surface configured to reflect fluid transmitted from the nozzle port to at least one of the first receiver port and the second receiver port; and
   a controller configured to position the reflector (i) in a first position relative to the jet-receiver valve to reflect the fluid from the nozzle port to the first receiver port and to the second receiver port in substantially equal amounts and (ii) in a second position relative to the jet-receiver valve to reflect the fluid from the nozzle port to the first receiver port and to the second receiver port in substantially unequal amounts;
   wherein the reflector surface comprises a first reflector element opposing the first receiver port and a second reflector element opposing the second receiver port, the first reflective element configured to align with the nozzle port and substantially direct the fluid to the first receiver port when the reflector orients in a first non-null position and the second reflective element configured to align with the nozzle port and substantially direct the fluid to the second receiver port when the reflector orients in a second non-null position.

2. The jet reflector assembly of claim 1 wherein the reflector comprises a flow splitter element oriented in proximity to the first reflector element and in proximity to the second reflector element, the flow splitter element configured to substantially cover the second receiver port when the reflector orients in a first non-null position and the flow splitter element configured to substantially cover the first receiver port when the reflector orients in a second non-null position.

3. The jet reflector assembly of claim 1 wherein the reflector comprises a flow splitter element, the flow splitter element configured to reflect the fluid from the nozzle port to the first receiver port and to the second receiver port in substantially equal amounts when the reflector orients a first position relative to the jet-receiver valve.

4. The jet reflector assembly of claim 1 wherein the first reflector element comprises a substantially curved surface defined by the reflector.

5. The jet reflector assembly of claim 4 wherein the substantially curved surface defined by the reflector extends along a length of the reflector surface.

6. The jet reflector assembly of claim 4 wherein the substantially curved surface defined by the reflector comprises a substantially hemispherical shape.

7. The jet reflector assembly of claim 1 wherein the second reflector element comprises a substantially curved surface defined by the reflector.

8. The jet reflector assembly of claim 7 wherein the substantially curved surface defined by the reflector extends along a length of the reflector surface.

9. The jet reflector assembly of claim 7 wherein the substantially curved surface defined by the reflector comprises a substantially hemispherical shape.

10. A servovalve comprising:
    a housing having a spool disposed within an opening defined by the housing and having a motor coupled to the housing;
    a jet-receiver valve coupled to the housing, the jet receiver valve having a fluid exchange surface defining a nozzle port, a first receiver port, and a second receiver port, the first receiver configured to orient in fluid communication with a first end of the spool and the second receiver configured to orient in fluid communication with a second end of the spool;
    a reflector having a reflector surface opposing the fluid exchange surface of the jet-receiver valve, the reflector surface configured to reflect a jet of fluid from the nozzle port to at least one of the first receiver port and the second receiver port; and
    a controller coupled to the motor and coupled to the reflector, the controller configured to position the reflector (i) in a first position relative to the jet-receiver valve to reflect the fluid from the nozzle port to the first receiver port and to the second receiver port in substantially equal amounts and (ii) in a second position relative to the jet-receiver valve to reflect the fluid from the nozzle port to the first receiver port and to the second receiver port in substantially unequal amounts;
    wherein the reflector surface comprises a first reflector element opposing the first receiver port and a second reflector element opposing the second receiver port, the first reflective element configured to align with the nozzle port and substantially direct the fluid to the first receiver port when the reflector orients in a first non-null position and the second reflective element configured to align with the nozzle port and substantially direct the fluid to the second receiver port when the reflector orients in a second non-null position.

11. The servovalve assembly of claim 10 wherein the reflector comprises a flow splitter element oriented in proximity to the first reflector element and in proximity to the second reflector element, the flow splitter element configured to substantially cover the second receiver port when the reflector orients in a first non-null position and the flow splitter element configured to substantially cover the first receiver port when the reflector orients in a second non-null position.

12. The servovalve assembly of claim 10 wherein the reflector comprises a flow splitter element, the flow splitter element configured to reflect the fluid from the nozzle port to the first receiver port and to the second receiver port in substantially equal amounts when the reflector orients a first position relative to the jet-receiver valve.

13. The servovalve assembly of claim 10 wherein the first reflector element comprises a substantially curved surface defined by the reflector.

14. The servovalve assembly of claim 13 wherein the substantially curved surface defined by the reflector extends along a length of the reflector surface.

15. The servovalve assembly of claim 13 wherein the substantially curved surface defined by the reflector comprises a substantially hemispherical shape.

16. The servovalve assembly of claim 10 wherein the second reflector element comprises a substantially curved surface defined by the reflector.

17. The servovalve assembly of claim 16 wherein the substantially curved surface defined by the reflector extends along a length of the reflector surface.

18. The servovalve assembly of claim 16 wherein the substantially curved surface defined by the reflector comprises a substantially hemispherical shape.

19. A method for adjusting a spool position in a servovalve comprising:
    orienting a reflector having a reflector surface opposite to a fluid exchange surface of a jet-receiver valve, the fluid exchange surface having defining a nozzle port, a first receiver port, and a second receiver port;
    positioning the reflector in a first position relative to the jet-receiver valve to reflect the fluid transmitted from the nozzle port to the first receiver port and to the second receiver port in substantially equal amounts; and
    positioning the reflector in a second position relative to the jet-receiver valve to reflect the fluid from the nozzle port to the first receiver port and to the second receiver port in substantially unequal amounts;
    wherein:
        orienting further comprises orienting a first reflector element opposite to the first receiver port and orienting a second reflector element opposite to the second receiver port;
        positioning the reflector in a first position further comprises substantially directing, by the first reflective element, the fluid to the first receiver port when the reflector orients in a first non-null position; and
        positioning the reflector in a second position further comprises substantially directing, by the second reflective element, the fluid to the second receiver port when the reflector orients in a second non-null position.

20. The method of claim 19 wherein
    the step of positioning in a first position further comprises orienting a flow splitter element relative to the second receiver port to substantially cover the second receiver port; and
    the step of positioning in a second position further comprises orienting the flow splitter element relative to the first receiver port to substantially cover the first receiver port.

* * * * *